United States Patent [19]

Jernigan

[11] Patent Number: 5,210,686
[45] Date of Patent: May 11, 1993

[54] MULTILEVEL BILL OF MATERIAL PROCESSING

[75] Inventor: John M. Jernigan, Roswell, Ga.

[73] Assignee: International Business Machines Corporation, Armonk, N.Y.

[21] Appl. No.: 600,455

[22] Filed: Oct. 19, 1990

[51] Int. Cl.$^5$ ............................................. G06F 15/24
[52] U.S. Cl. .................... 364/403; 364/401; 364/468
[58] Field of Search ............... 364/401, 403, 406, 468, 364/478

[56] References Cited

U.S. PATENT DOCUMENTS

| | | | |
|---|---|---|---|
| 4,459,663 | 7/1984 | Dye | 364/403 |
| 4,646,238 | 2/1987 | Carlson, Jr. et al. | 364/468 |
| 4,821,197 | 4/1989 | Kenik et al. | 364/468 |
| 4,847,761 | 7/1989 | Ferriter et al. | |
| 4,862,376 | 8/1989 | Ferriter et al. | |
| 4,924,385 | 5/1990 | Dote | 364/403 |
| 5,109,337 | 4/1992 | Ferriter et al. | 364/401 |

OTHER PUBLICATIONS

"Structured Bill of Material Explode", by W. R. Dono and J. H. McMahon, IBM TDB, vol. 17, No. 11, Apr. 1975, pp. 3370–3372.

Primary Examiner—Roy N. Envall, Jr.
Assistant Examiner—Jennifer L. Hazard
Attorney, Agent, or Firm—John J. Timar

[57] ABSTRACT

A method and system for processing a multilevel bill of material contained in a relational database that does not require a pre-established limit on the number of levels that can be processed and minimizes user lock out from the same data. A control table keeps track of each component retrieved at a given level of the bill of material, tagging each table entry with a component item identifier, bill of material level, and component sequence number, which identifies the order in which components are processed at each level. A counter is used to keep track of the next level in the bill of material to be processed and a stack data structure is used to indicate the sequence number of the next component to be processed at a given level. The contents of the counter and top of the stack are used to index into the control table to select for processing the entry in the table that has a bill of material level and sequence number matching the contents of the counter and top of stack, respectively.

12 Claims, 7 Drawing Sheets

EXPLOSION CONTROL TABLE /36

| ITEM NO. | BOM LEVEL NO. | COMPONENT SEQUENCE NO. |
|---|---|---|
| A | 0 | 1 |
| B | 1 | 1 |
| C | 1 | 2 |
| D | 2 | 1 |
| E | 2 | 2 |
| F | 2 | 3 |
| G | 3 | 1 |
| H | 3 | 2 |

ITEM MASTER TABLE ⎯42

| ITEM NO. | DESCRIPTION | PRICE | ... |
|---|---|---|---|
| A123_D45 | WHEEL INSERT | .05 | ... |
| A145_J19 | WHEEL | 2.25 | ... |
| A167_E27 | AXLE | 1.10 | ... |
| A730_A01 | AXLE ASSEMBLY | 5.70 | ... |

BILL OF MATERIAL COMPONENTS TABLE ⎯44

| ITEM NO. | SUBCOMPONENT | QUANTITY | ... |
|---|---|---|---|
| A145_J19 | A123_D45 | 1.00 | ... |
| B730_A01 | A145_J19 | 2.00 | ... |
| B730_A01 | A167_E27 | 1.00 | ... |

EXPLOSION CONTROL TABLE ⎯36

| ITEM NO. | BOM LEVEL NO. | COMPONENT SEQUENCE NO. |
|---|---|---|
| A | 0 | 1 |
| B | 1 | 1 |
| C | 1 | 2 |
| D | 2 | 1 |
| E | 2 | 2 |
| F | 2 | 3 |
| G | 3 | 1 |
| H | 3 | 2 |

FIG 5A  FIG 5B  FIG 5C  FIG 5D  FIG 5E
FIG 5F  FIG 5G  FIG 5H  FIG 5I  FIG 5J
FIG 5K  FIG 5L  FIG 5M  FIG 5N  FIG 5O

| ITEM NO. | BOM LEVEL NO. | COMPONENT SEQUENCE NO. |
|---|---|---|
| A | 0 | 1 |

FIG 6A

| ITEM NO. | BOM LEVEL NO. | COMPONENT SEQUENCE NO. |
|---|---|---|
| A | 0 | 1 |
| B | 1 | 1 |
| C | 1 | 2 |

FIG 6B

| ITEM NO. | BOM LEVEL NO. | COMPONENT SEQUENCE NO. |
|---|---|---|
| A | 0 | 1 |
| B | 1 | 1 |
| C | 1 | 2 |
| D | 2 | 1 |
| E | 2 | 2 |
| F | 2 | 3 |

FIG 6C

| ITEM NO. | BOM LEVEL NO. | COMPONENT SEQUENCE NO. |
|:---:|:---:|:---:|
| A | 0 | 1 |
| B | 1 | 1 |
| C | 1 | 2 |
| D | 2 | 1 |
| E | 2 | 2 |
| F | 2 | 3 |
| G | 3 | 1 |
| H | 3 | 2 |

FIG 6D

MULTILEVEL BILL OF MATERIAL PROCESSING

BACKGROUND OF THE INVENTION

The present invention relates, in general, to database management systems and, in particular, to a method and system for more efficiently processing a bill of material data file stored in a relational database when performing a multilevel explosion of the data file.

For several engineering and production planning application areas, bill of material processing is a key application. The bill of material application is the basis for production and inventory control, cost accounting, and the implementation of engineering changes. Bills of material are structured so that components of each part are provided recursively, which allows the subcomponents of a part or the use of a part within higher level assemblies to be provided quickly. The relationship among parts in a bill of material is many-to-many. A part can require a number of other parts and can also be used in higher level parts. The relationship among parts can be complex, but it cannot be cyclical.

Implementing a bill of material in a relational database system is straightforward but presents performance problems during a parts explosion due to limitations contained in corresponding database languages. A commercially available relational database management system is IBM Corporation's Database 2 (DB2) which uses the Structured Query Language (SQL) as the high level data access language. One approach to storing bills of material in a DB2 database involves the use of two tables, one to define all data relating to an item (master item table), and a second one which defines single level bills of material (bill of material component table). This approach allows the database user to determine the immediate subcomponents of an assembly (single level parts explosion) or to determine in which assemblies a subcomponent is used (single level parts implosion). In embedded SQL, the SELECT statement retrieves an entire set of records, i.e., a table. The mechanism used to access records in the set one by one is referred to as a cursor which is essentially a pointer providing addressability to each of the records in turn. OPEN, FETCH, and CLOSE are three executable statements provided by SQL to operate on cursors. The OPEN statement activates a cursor and executes the query associated with the cursor, thereby identifying a current active set of records. The FETCH statement advances the cursor to the next record in the active set. The CLOSE statement deactivates the cursor. An excellent discussion of relational database systems is contained in "An Introduction to Database Systems", Vol. I, 4th Ed., by C. J. Date, Addison-Wesley Publishing Company, Inc., 1986.

Current algorithms for performing multilevel bill of material explosions on a relational database require the use of multiple open cursors to perform the depth first search for components. This results in two specific problems. The first of these problems arises since cursors are declared statically with a different cursor required for each new level in the bill of material; the limit on the maximum number of levels that may exist in any bill of material must be set to the number of cursors declared in the explosion routine. The second problem is the inaccessibility of large parts of the database during execution of the explosion routine since each open cursor locks the database row that it has fetched.

The present invention solves both of these problems by using control data structures during bill of material explosions, which remove the need for multiple open cursors and also reduce the time during which cursors remain open.

SUMMARY OF THE INVENTION

It is an object of this invention to provide an improved method for processing bills of material stored in relational databases without requiring a limitation on its maximum depth (i.e., levels).

It is another object of this invention to provide a method for exploding a bill of material that does not lock out other users from access to all of the rows of the bill of material data file that are being exploded.

It is a further object of this invention to provide a method for performing a multilevel bill of material explosion without requiring the use of multiple open cursors representing each level in the explosion.

It is a still further object of this invention to provide an improved system for performing multilevel bill of material explosions.

These and other objects and advantages are accomplished by the present invention in which information is passed by host variables from one cursor to another with each cursor being selectively opened and closed during the traversal of the hierarchy of the parts explosion. Three data structures are implemented to control processing. The first of these is the explosion control table which contains the results of exploding an assembly down one branch of the bill of material.

Instead of keeping the cursor open for each assembly, all the components of an assembly are fetched and added to the explosion control table. The temporary table can be either a DB2 table or a linked list or array in memory. Since the table contains only those components found during the downward traversal of one branch of the bill of material, its size is small when compared to the entire component table.

The second data structure implemented is a current level counter that is incremented each time an assembly is exploded an additional level down the currently active branch of the bill of material. The counter is subsequently decremented after all components at a given level of the bill of material have been processed completely.

The final data structure implemented is a stack of counters that indicates the current active component at each level of the bill of material. The stack of counters uses sequence numbers that allow direct access to the next component on a level to explode when explosion of the previous component on that level has been completed.

BRIEF DESCRIPTION OF THE DRAWINGS

FIGS. 5A-5O illustrate changes in the current level counter and current component sequence stack of this invention during an explosion of the simple bill of material structure of FIG. 3A.

FIGS. 6A-6D illustrate the changes in the explosion control table of this invention during an explosion of the bill of material structure of FIG. 3A.

DETAILED DESCRIPTION OF THE PREFERRED EMBODIMENT

Figure 1:
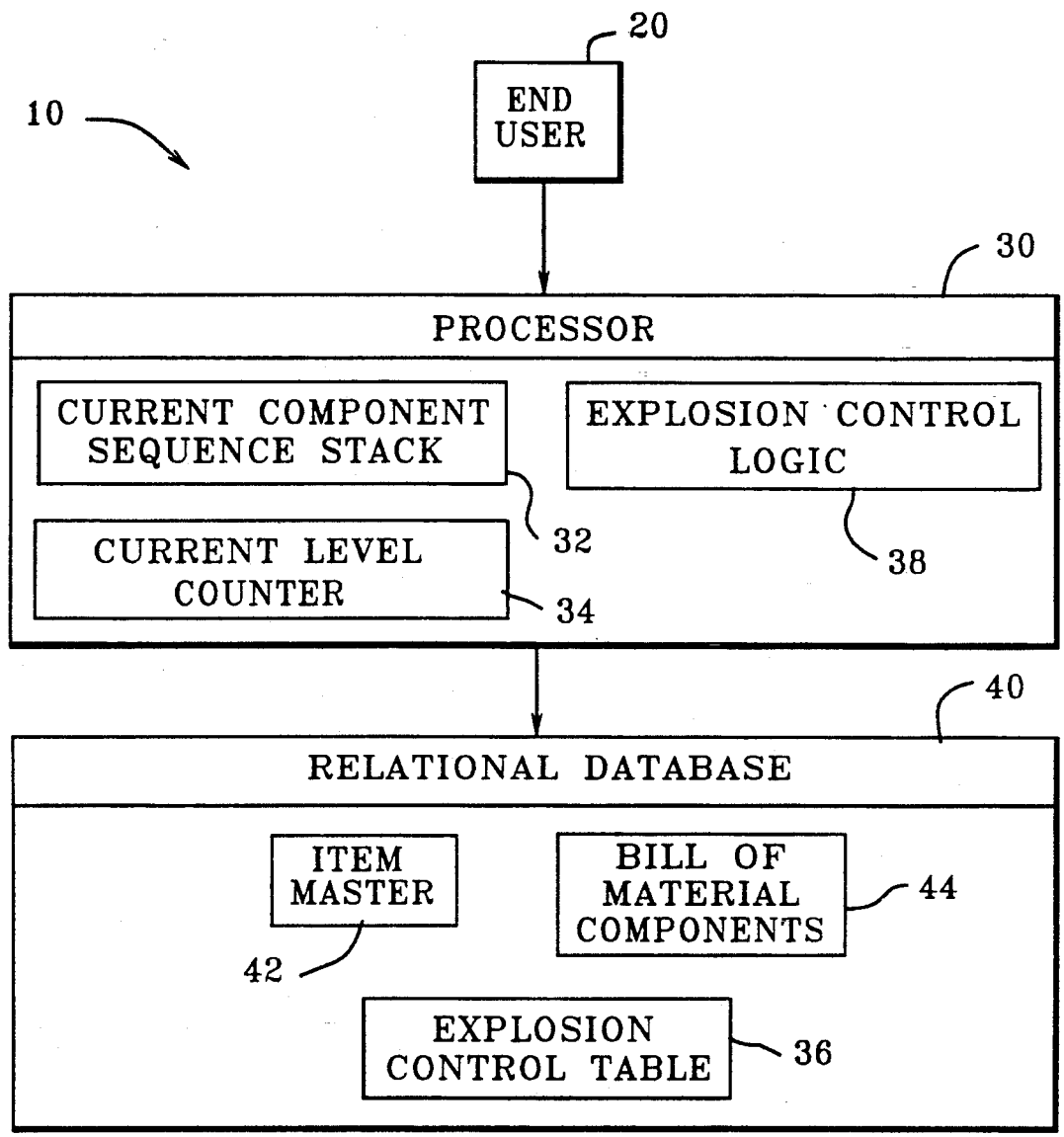
FIG. 1 illustrates a block diagram implementation of the data structures used in this invention for bill of material processing.
Figures 2, 3A, 3B:
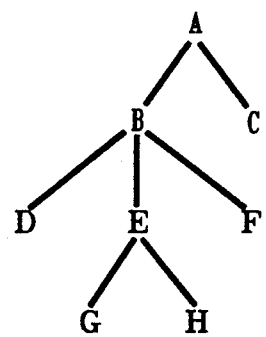
FIG. 2 illustrates a typical layout for the item master and bill of material, components table.
FIGS. 3A-3B illustrate the hierarchical structure of a simple bill of material and the entries made in the explosion control table of this invention.

The data structures used in the implementation of this invention are illustrated by bill of material processing system 10 in FIG. 1. As shown in the figure, an end user 20 interacts through processor 30 with relational data files stored on direct access storage device (DASD) 40. Permanently stored on DASD 40 are the item master (parts) file 42 and the bill of material components file 44. The explosion control table 36 is a temporary file shown as being located in the relational database. However, this data structure could also be implemented as a linked list or array in memory. Typical layouts for item master file 42 and bill of material components file 44 are shown in FIG. 2. Processor 30 includes a random access memory containing two new data structures identified as current component sequence stack 32 and current level counter 34. Shown also is explosion control logic 38 which includes the software logic used in the bill of material explosion process.

In performing a bill of material explosion, the explosion control logic 38 loops through each branch of the bill of material tree structure until all assemblies have been exploded. The explosion control logic follows a bill of material branch from top to bottom, and upon reaching the bottom of a branch, starts back up the branch to the preceding level looking for the next branch to explode. The explosion control process commences by putting the starting item in the explosion control table. This would typically be a product or end item, but any assembly or subassembly can be exploded. The current level counter 34 is initialized to zero and the empty current component sequence stack 32 has a sequence number of one pushed on top of the stack.

Explosion control logic 38 uses the current level counter 34 and current component sequence stack 32 to key into the explosion control table 36. The bill of material components data file 44 is searched for all components having the particular assembly as a parent. In searching for these components, a cursor is opened, the components are fetched, and then the cursor is closed. As components are fetched, they are added to the explosion control table with the following information: item number, bill of material level, and component sequence number. A simple bill of material structure tree is illustrated in FIG. 3A and a corresponding explosion control table is illustrated in FIG. 3B.

The item number is placed in the first field of the explosion control table 36 and is used as the key to index into the bill of material components data file 44 and move to a deeper level of the bill of material. The bill of material level is placed in the second field of the explosion control table 36 and represents the current component level within the bill of material explosion, i.e., the value in the current level counter incremented by one. The purpose of this field is to enable quick discarding of a component of an assembly when completely exploded and to determine the next item to explode when moving back up the bill of material. As each component is retrieved, it is assigned an increasing component sequence number starting with the number one. The component sequence number is placed in the third field of the explosion control table 36. The component sequence number field takes the place of the cursor and, together with the bill of material level, enables direct retrieval of the next item to explode.

If component items were added to explosion control table 36 at commencement of processing, then explosion control program 38 increments the current level counter 34 and pushes a sequence number of one onto the current component sequence stack 32. On the other hand, if no items were added to the explosion control table 36, implying the parent assembly had no defined components, then the current level counter 34 is not incremented. Retrieving all of the components of an assembly and adding them to the explosion control table 36 with the control data (item number, bill of material level, component sequence number) described above eliminates the need to keep the cursor open at each level as each component is exploded. Since the cursor is closed after fetching components at each level, the same cursor may be used when each component is exploded, thus removing the need to declare a separate cursor for each level in the bill of material.

In the next phase of processing, explosion control program 38 determines the branch of the bill of material to traverse. Assuming that several new components have been added to the explosion control table 36, the current component sequence stack 32 is used to identify the next component to explode at each level. The top of the stack 32 contains the sequence number of the last component used, which is then incremented to advance to the next component on the same level. The current level counter 34 and current component sequence stack 32 are thus used together to retrieve the next component from the explosion control table 36.

If an entry is found in explosion control table 36 matching these keys, explosion control logic 38 then causes those components that match the parent assembly to be retrieved. If no entry is found in explosion control table 36, then all components at the specific level in the bill of material have been processed. Before starting a traversal back up the branch, all components at the current level (identified by the value contained in current level counter 34) are deleted from the explosion control table 36. This is followed by decrementing the current level counter 34 by one and popping the current component sequence stack 32. Unless the value in the current level counter is less than zero, processing continues at the next higher level in the bill of material. The component sequence number contained in the top of the current component sequence stack 32 is incremented to advance to the next component to explode. When the value in current level counter 34 is less than zero, all components in the bill of material have been processed and the explosion control program 38 terminates.

Figure 4A:
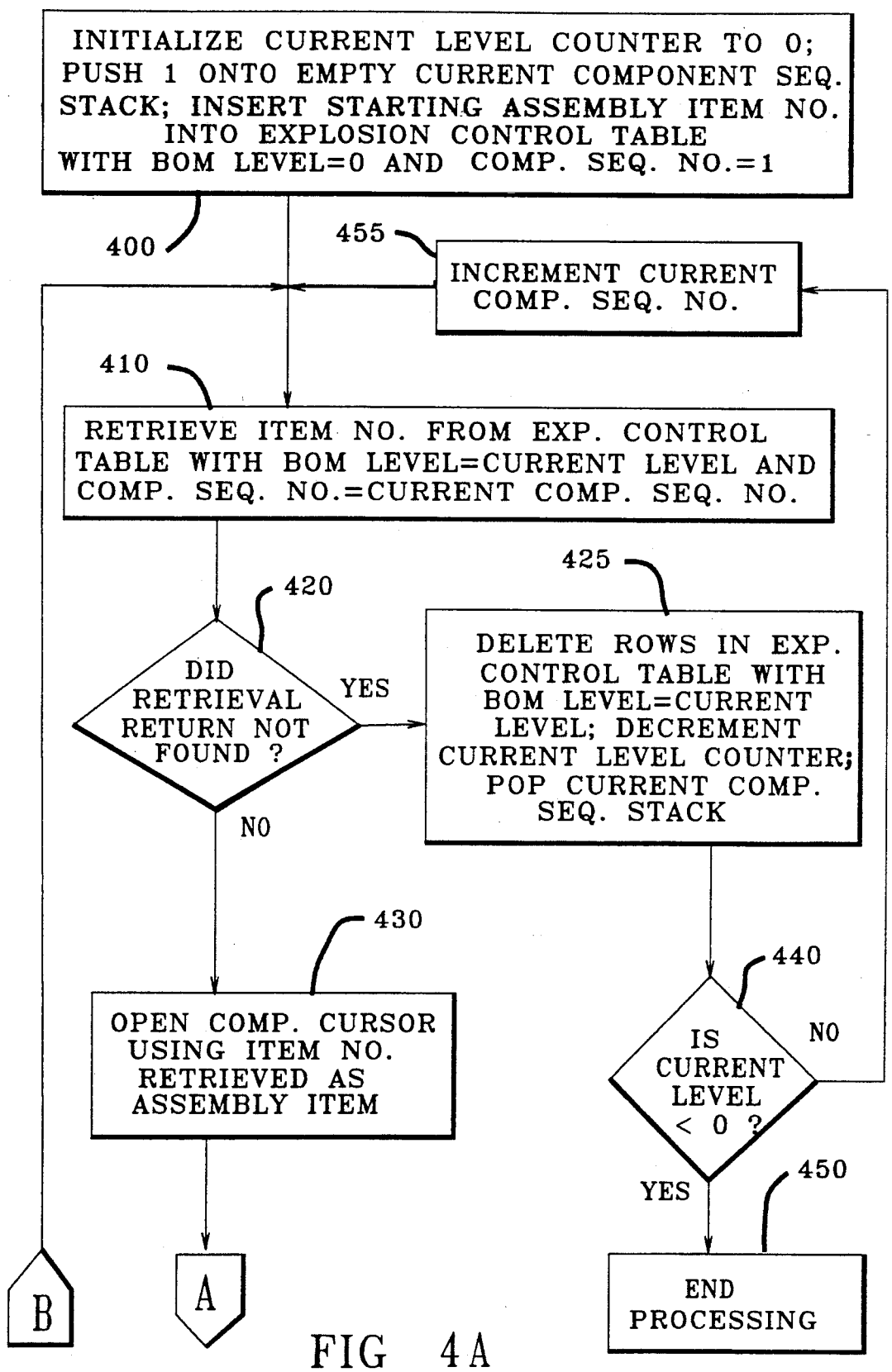
FIGS. 4A-4B show a flow diagram illustrating the algorithm for controlling multilevel bill of material explosions.
Figure 4B:
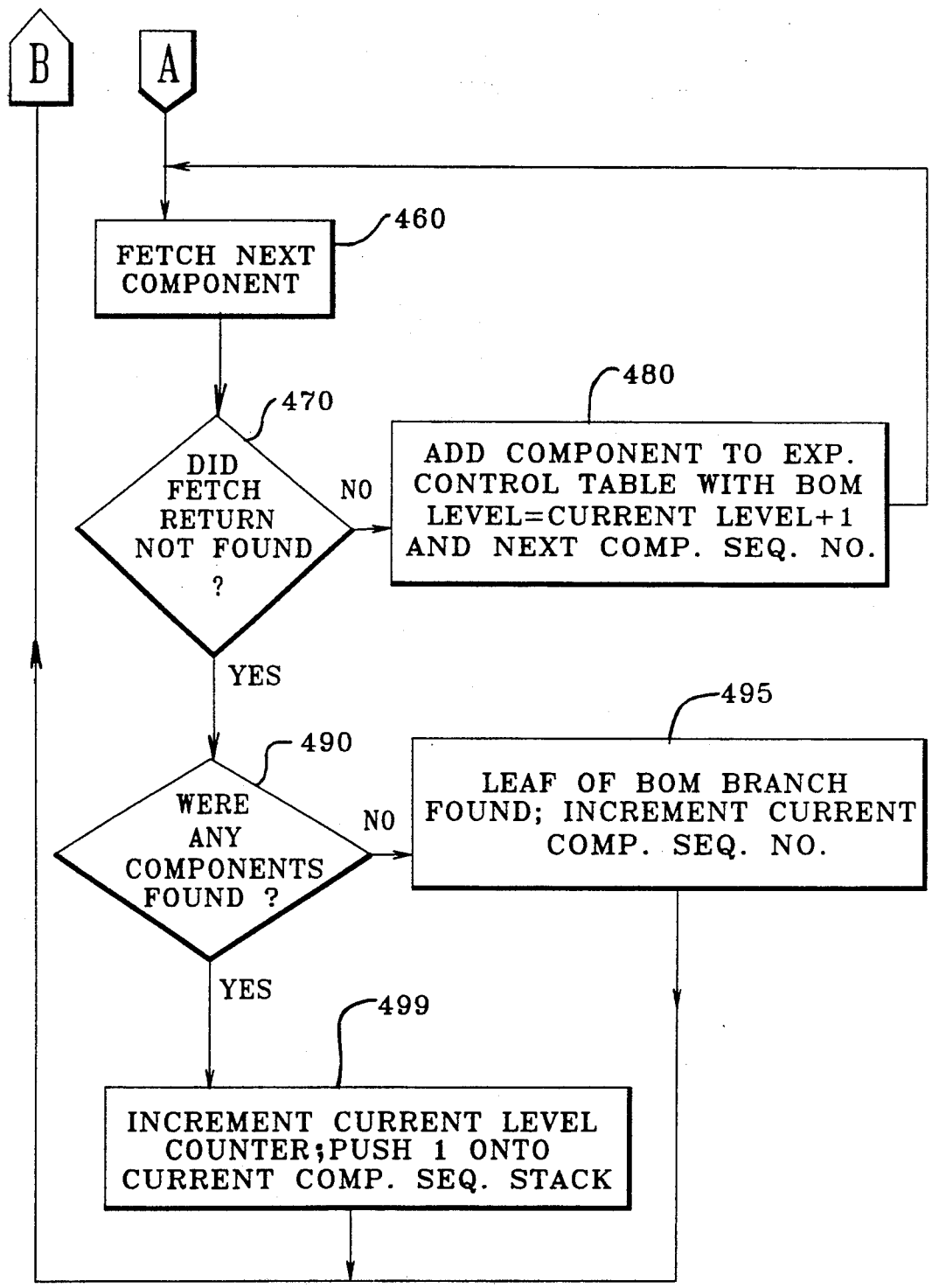

The processing performed by explosion control logic 38 is illustrated by the flow chart of FIGS. 4A-4B. Logic block 400 indicates the initialization step. The value in current level counter 34 is set to zero, a value of one is pushed onto the top of the empty current component sequence stack 32, and the starting assembly item number is inserted into explosion control table 36 with a bill of material level of zero and a component sequence number of one. In logic block 410, an item number is retrieved from explosion control table 36 that has bill of material level and component sequence number equal to the values in current level counter 34 and on the top of the current component sequence stack 32.

A test is made in decision block 420 to determine if an assembly item number was retrieved. If an item number was retrieved, then in logic block 430 a component cursor is opened using the item number retrieved as the assembly item. A fetch operation is then performed in logic block 460 followed by a test in decision block 470 to determine if a component was found. If a component was found, then logic block 480 adds the component to the explosion control table 36 with its bill of material level set equal to the value in current level counter 34 incremented by one, and the next component sequence number at that level is assigned. Following processing by logic block 480, control loops back to logic block 460 to reach for other components at the same level.

Decision block 490 tests to determine if any components were found during the search at the current level. If none were found, it indicates the leaf of the branch being traversed was found. The current component sequence number is then incremented in logic block 495 and control returns to logic block 410. If in decision block 490, components were found during the search at the current level, a leaf has not yet been reached. Consequently, in logic block 499 the current level counter 34 is incremented and a one is pushed onto the top of the current component sequence stack 32. Control then returns to logic block 410.

After control returns to logic block 410, the explosion control logic 38 again tests in decision block 420 if an item number was retrieved from the explosion control table 36 having a bill of material level number and a component sequence number equal to the values in current level counter 34 and on top of current component sequence stack 32. If no match was found, control passes to logic block 425 where all rows having a bill of material level number equal to the value in current level counter 34 are deleted from the explosion control table 36. The value in current level counter 34 is decremented by one and the top of the current component sequence stack 32 is popped. Following the decrementing of current level counter 34, a test is made in logic block 440 to determine if the current level is a negative value. If it is, bill of material processing is completed and logic block 450 terminates processing. If the current level is a non-negative value, then the top of the current component sequence stack is incremented in logic block 455 and control returns to logic block 410.

FIGS. 5A-5O and 6A-6D provide an example of the use of the data structures in handling a bill of material explosion for the simplistic three level, eight item bill of material structure shown in FIG. 3A. During the start up phase, the current level counter 34 is initialized to zero and the top of the current component sequence stack 32 is initialized to one as shown in FIG. 5A. The starting assembly represented by item number A is inserted into the explosion control table 36 with a bill of material level number of zero and a component sequence number of one.

In the first pass through the processing logic of FIG. 4, item number A is retrieved from explosion control table 36 since its bill of material level number and component sequence number are equal to the values in current level counter 34 and on the top of current component sequence stack 32 (logic block 410). The component cursor is opened and components B and C are fetched and inserted into explosion control table 36 shown in FIG. 6B with bill of material level equal to the value in the current level counter 34 incremented by one (logic block 480) and component sequence numbers of one and two respectively. Since components were found in this pass, the current level counter 34 is incremented to commence movement down one branch of the bill of material, and a current component sequence number of one is pushed onto the current component sequence stack 32 for the new level (logic block 499). This is indicated in FIG. 5B.

In the next pass through the loop, item B is first retrieved from the explosion control table 36 since its bill of material level number and component sequence number match the values in current level counter 34 and on top of current component sequence number stack 32. The component cursor fetches items D, E, and F which are inserted into the explosion control table 36 with the appropriate bill of material level number and component sequence number. The results are shown in FIG. 6C. The current level counter 34 is incremented to 2 and another entry of one is pushed onto the top of current component sequence stack 32 as shown in FIG. 5C.

On the next pass through the main processing loop, no components are found under item D following the opening of the component cursor. This indicates that a leaf of a bill of material branch has been found (i.e., one branch of the bill of material structure tree has been completed); therefore, the explosion control table 36 is left unchanged. Logic block 495 causes the current component sequence number on the top of current component sequence stack 32 to be incremented from one to two, as shown in FIG. 5D, to advance to the next branch of the bill of material.

Items G and H, which are subcomponents of item E, are next retrieved and inserted into the explosion control table 36 as illustrated in FIG. 6D. These items are at bill of material level 3 and have component sequence numbers of one and two, respectively. Since components were found, the current level counter 34 is incremented to three, and a component sequence number of one is pushed onto the current component sequence stack 32. The results are shown in FIG. 5E.

Item G is retrieved next from explosion control table 36, but since it is a leaf at the end of a branch of the bill of material structure tree, the explosion control table is left unchanged and the current component sequence number on top of current component sequence stack 32 is incremented to move to the next branch of the bill of material. The contents of current component sequence stack 32 after this step are shown in FIG. 5F. This same process is repeated with item H which is another leaf node, and results in the top of the current component sequence stack 32 being incremented to 3 as shown in FIG. 5G.

Since on the next pass through the processing loop, no row is found in explosion control table 36 matching the value in current level counter 34 and the value at the top of current component sequence stack 32, the next branch to process must be found by backing up one level in the bill of material tree. In order to back up one level, all rows in the explosion control table 36 having a bill of material level number equal to the value in current level counter 34 are deleted (logic block 425). Since the current level is 3, the rows representing items G and H are deleted from the table. The contents of explosion control table 36 are the same as shown in FIG. 6C. This is followed by decrementing current level counter 34 from 3 to 2 and popping the top of current component sequence stack 32. The net results are shown in FIG. 5H. Since the current level counter is not negative, logic block 455 is executed to increment the value now at the top of current component sequence stack from 2 to 3 (FIG. 5I).

Item F is processed next and is found to be a leaf node; therefore, the explosion control table 36 is left unchanged. The current component sequence number at the top of current component sequence stack 32 is incremented from 3 to 4 as shown in FIG. 5J. No match is found in explosion control table 36 between the value at the top of the current component sequence stack 32 and the component sequence numbers in the table. Processing must back up another level of the bill of material tree. Thus, logic block 425 causes the rows having a bill of material level matching the value of 2 in current level counter 34 to be deleted from explosion control table 36. The table contents are as shown in FIG. 6B. The current level counter 34 is decremented to one and the top of current component sequence stack 32 is popped as indicated in FIG. 5K. This is followed by incrementing the new top of the stack as shown in FIG. 5L.

Item C is processed next and is found to be a leaf node. The current component sequence number on top of the stack is incremented from 2 to 3 with results as shown in FIG. 5M. No row is found in which bill of material level and component sequence number match the value of one in current level counter 34 and the value of three at the top of current component sequence stack 32. Rows for item B and C are deleted from explosion control table 36 to result in the contents shown in FIG. 6A. The top of the stack 32 is popped and the current level counter is decremented to zero as shown in FIG. 5N. Next, the top of the stack is incremented to two as illustrated in FIG. 5O.

The final pass through the processing loop finds no match in explosion control table 36 causing the row for item A to be deleted and leaving the table empty. The current level counter 34 is decremented to −1 and the top of current component sequence stack 32 is popped, leaving the stack empty. Since the test on the current level counter in logic block 440 finds the contents negative, the bill of material processing is completed.

While the invention has been particularly shown and described with reference to the particular embodiment thereof, it will be understood by those skilled in the art that various changes in form and details may be made therein without departing from the spirit and scope of the invention.

Having thus described my invention, what I claim and desire to secure by letters patent is as follows:

What is claimed is:

1. A method for processing a hierarchical bill of material component data file stored in a relational database on a data processing system having a processor, a memory and an external storage device, said hierarchical bill of material component data file having a plurality of levels defining components of a product structure assembly in increasing detail in proceeding from the highest level to the lowest level in said product structure assembly, said method comprising:

adding an item identifier for said product structure assembly to an explosion control table to initiate processing of said hierarchical bill of material component data file;

incrementing a current level counter in said memory to indicate the level in said hierarchical bill of material component data file to be processed next;

retrieving each component at the level indicated by the current level counter and inserting said each component in an explosion control table;

sequentially processing each component retrieved at the level indicated by the current level counter to determine if said each component contains a lower level component in said hierarchical bill of material component data file;

for each lower level component found, repeating said steps of incrementing the current level counter, retrieving each component at the level indicated, and sequentially processing each component retrieved until each component at the lowest level along a branch in said hierarchical bill of material component data file has been processed;

removing each component at the current level from said explosion control table after the lowest level along the branch has been processed and decrementing said current level counter to indicate the level in said hierarchical bill of material component data file to be processed next; and terminating processing of said hierarchical bill of material component data file when said current level counter has been decremented to a negative value.

2. The method of claim 1 wherein the step of inserting said each component in the explosion control table includes adding an item number identifier, an associated bill of material level identifier and an associated component sequence number identifier for said each component to a row of said explosion control table.

3. The method of claim 2 wherein the step of sequentially processing each component includes using the component item number identifier of said each component as a search key in the bill of material component data file to locate the lower level component, if any, for said each component in said bill of material component data file.

4. The method of claim 2 further including the step of maintaining a current component sequence stack in said memory to track the component being processed at the level of the bill of material component data file indicated by the current level counter, a value on the top of the stack identifying the component sequence identifier of the component being processed at the level indicated by the current level counter, the values stored below the top of the stack identifying successively a last component processed at each higher level in said bill of material.

5. The method of claim 4 wherein the step of maintaining said current component sequence stack includes:

pushing a new value onto the top of said current component sequence stack to initiate processing of the next level below the level of said bill of material component data file indicated by the current level counter;

incrementing the value on the top of said current component sequence stack in order to advance to the next component to be processed at the level of said bill of material component data file indicated by the current level counter; and popping the value on the top of said current component sequence stack after completion of processing of all components at the level indicated by the current level counter is detected.

6. The method of claim 5 wherein the step of detecting completion of processing at each level in said hierarchical bill of material component data file includes:

searching the explosion control table using the bill of material level field as a search key to identify each component having the bill of material level that is the same as the level indicator by the current level counter;

for each component identified as having the bill of material level equal to the level indicated by the current level counter, examining said each component identified to determine if its component sequence number is the same as the value on the top of the current component sequence stack; and if no match is found after examining said each component identified, deleting the row in the explosion control table corresponding to said each component identified.

7. The method of claim 1 wherein said explosion control table is a temporary data table stored in said memory.

8. The method of claim 1 wherein said explosion control table is a database file stored in the relational database on the storage device.

9. A method for processing a hierarchical bill of material component data file generated by a relational computer database said hierarchical bill of material component data file containing a plurality of levels defining components of a product structure assembly in increasing detail in proceeding from a higher to a lower level in said product structure assembly and in which the level being processed constitutes the only row in the bill of material component data file that is inaccessible to other users, said method comprising:

adding an item identifier for the product structure assembly to an explosion control table to initiate processing of said hierarchical bill of material component data file;

retrieving each immediate component of the product structure assembly that is at a first level in the bill of material component data file and adding said each immediate component to the explosion control table;

incrementing a counter to determine a next lower level in said hierarchical bill of material data file to process after each component at the first level is retrieved and added to the explosion control table;

retrieving each component at said next lower level in said hierarchical bill of material data file and adding said each component at said next lower level to the explosion control table;

repeating said steps of incrementing a counter to determine a next lower level and retrieving and adding each component at said next lower level until the lowest level along a branch of said hierarchical bill of material component data file has been processed;

removing each component at said lowest level along the branch of said hierarchical bill of material component data and decrementing the counter in order to return to a next higher level and continue processing along a next branch of said hierarchical bill of material component data file;

terminating the processing of the hierarchical bill of material component data file when the counter has been decremented to a negative value.

10. The method of claim 9 wherein each component added to said explosion control table contains an item number, a level number and a sequence number, the sequence number being incremented as each component is added to identify an order in which each component at the same level is processed.

11. The method of claim 10 further including:

pushing a numerical value of one on the top of a stack data structure to determine the ordering scheme for explosion of each component at said next lower level;

comparing the contents of the counter and the numerical value on top of the stack with the level number and sequence number for each component added to the explosion control table to determine the component to process at said next lower level.

12. The method of claim 11 further including incrementing the numerical value on the top of the stack after each component at the next lower level in the hierarchical bill of material data file is retrieved and added to the explosion control table and popping the numerical value on the top of the stack after each component at the next lower level has been processed.

* * * * *